United States Patent [19]

Ogusu

[11] Patent Number: 5,724,332
[45] Date of Patent: Mar. 3, 1998

[54] DISK LOADING TECHNIQUE PERMITTING LOADING OF BOTH A DISK SET IN A DISK LOADING ADAPTOR AND A NAKED DISK

[75] Inventor: Mikio Ogusu, Hamamatsu, Japan

[73] Assignee: Yamaha Corporation, Hamamatsu, Japan

[21] Appl. No.: 470,979

[22] Filed: Jun. 6, 1995

[30] Foreign Application Priority Data

Jun. 13, 1994 [JP] Japan ................................ 6-154140

[51] Int. Cl.⁶ ............................ G11B 17/03; G11B 23/03
[52] U.S. Cl. ............................................ 369/77.2; 369/291
[58] Field of Search ................................ 369/77.2, 77.1, 369/291; 360/99.02, 9.03, 99.06, 99.07, 133

[56] References Cited

U.S. PATENT DOCUMENTS

| | | | |
|---|---|---|---|
| 5,140,489 | 8/1992 | Barnard | 369/77.2 X |
| 5,150,354 | 9/1992 | Iwata et al. | 369/291 |
| 5,181,197 | 1/1993 | Sugie et al. | 369/75.1 |
| 5,226,025 | 7/1993 | Ikedo et al. | 369/36 |
| 5,299,185 | 3/1994 | Sakurai et al. | 369/77.2 X |
| 5,301,176 | 4/1994 | Kawachi et al. | 369/77.2 X |
| 5,388,094 | 2/1995 | Park | 369/270 |
| 5,537,389 | 7/1996 | Kuwa et al. | 369/291 |

FOREIGN PATENT DOCUMENTS 4349266 12/1992 Japan ................................ 369/75.1

Primary Examiner—Stuart S. Levy
Assistant Examiner—William R. Korzuch
Attorney, Agent, or Firm—Loeb & Loeb LLP

[57] ABSTRACT

A disk loading system includes a disk drive and a disk loading adaptor. The disk loading adaptor is composed of a tray member and a case member, between which is formed an internal space for receiving an information recording disk. The tray member can be pulled to slide away from the case member while the case member remains held in the disk drive, so that the loading adaptor is opened to allow the operator to access the disk.

9 Claims, 10 Drawing Sheets

FIG. 10A CLOSING

FIG. 10B CLOSING(PUSHED IN BY DISTANCE d)

DISK LOADING TECHNIQUE PERMITTING LOADING OF BOTH A DISK SET IN A DISK LOADING ADAPTOR AND A NAKED DISK

BACKGROUND OF THE INVENTION

The present invention relates generally to disk loading techniques for loading a CD (Compact Disk) or other disk-shaped recording medium into a disk drive for recording or reproduction onto or from the recording medium. More particularly, the present invention relates to a disk loading technique to permit loading of both a disk set in a loading adaptor and a "naked" disk not set in the loading adaptor.

As methods of loading a disk recording medium into a disk drive are conventionally known a tray type loading method extensively employed in CD players and a slot-in type loading method employed in CD-ROM drives. As shown in FIG. 2, according to the tray type loading method, a tray 12 is provided in a disk drive 10 (i.e., disk reproducing, recording or recording/reproducing device) for movement between a retracted position where the tray 12 is wholly retracted within the drive 10 and an advanced position where most of the tray projects out of the drive 10 for access by an operator (a person operating the drive 10); a disk 14 is placed on the tray 12 while the tray 12 is in the advanced position and loaded into the disk drive 10 by the tray 12 moving to the retracted position. In the slot-in loading method, as shown in FIG. 3, a disk 16 is set in a separate disk cartridge 18 and then loaded with the cartridge 18 into the disk drive 22 through an insertion slot 20.

However, the conventional tray type loading method as shown in FIG. 2 has the disadvantage that the disk 14 would easily be damaged because it is handled in an unprotected or naked condition. The slot-in type loading method as shown in FIG. 3 is also disadvantageous in that, although the disk 16 is less likely to be damaged because it is protected within the cartridge 18, bothersome re-setting of disk in the cartridge 18 is necessary in the case where the number of the cartridges is very small relative to the number of disks, thus making the disk handling a time-consuming work.

SUMMARY OF THE INVENTION

It is therefore an object of the present invention to provide a disk loading technique which permits loading of both a disk set in a disk loading adaptor and a naked disk not set in a disk loading adaptor, to thereby greatly simplify the disk handling operation.

In order to accomplish the above-mentioned object, the present invention provides a disk loading system which comprises a disk loading adaptor for removably setting therein an information recording disk, and a disk drive for having the disk loading adaptor detachably attached thereto, the disk drive, in a condition where the loading adaptor is attached thereto, being capable of moving the loading adaptor between a first state to allow recording or reproduction onto or from the disk and a second state to allow the disk to be removed from the loading adaptor and changed for another disk.

To change both of the currently-loaded disk and loading adaptor for another disk set in another loading adaptor, the current loading adaptor is detached from the disk drive along with the disk and then the other disk loading adaptor containing the other disk is attached to the disk drive. To load a naked disk, the current loading adaptor is moved to the second state, where the current disk can be removed and changed for the naked disk without the need to detach the current loading adaptor itself from the disk drive. This arrangement permits loading of both a disk previously set in a disk loading adaptor and a naked disk not previously set in a disk loading adaptor.

The present invention also provides a disk loading adaptor for attachment to a disk drive which comprises a tray member for removably holding an information recording disk, and a case member mounted on the tray member and movable relative to the tray member to open or close the loading adaptor, the disk being held on the tray member in a space formed between the tray and case members, the disk held on the tray member being capable of being changed for another disk by moving at least one of the tray and case members outwardly away from the other of the tray and case members to open the loading adaptor while the adaptor remains attached to the disk drive. Since the disk loading adaptor is comprised of the tray and case members and at least one of the tray and case members is movable outwardly away from the other to open the loading adaptor while the adaptor remains attached to the disk drive, the disk can be changed without the need to detach the current loading adaptor itself from the disk drive. Accordingly, loading of a naked disk can be done with ease.

The disk loading adaptor may comprise a resilient section for normally urging the tray and case members in a direction to open the leading adaptor, and a locking section for locking the tray and case members in a condition to close the loading adaptor against the biasing force of the resilient section. In this case, the disk can be changed for another disk by releasing the locking state between the tray and case members to open the leading adaptor by the biasing force of the resilient section.

In a preferred mode of embodiment, the loading adaptor may be attached to or detached from the disk drive by an entirety of the loading adaptor sliding relative to the disk drive. In this case, the disk held on the tray member can be changed for another disk by, while the case member remains attached to the disk drive, allowing the tray member to slide outwardly away from the case member in a direction substantially parallel to a sliding direction of the entirety of the loading adaptor. Because the tray member is allowed to slide to open the loading adaptor while the case member remains attached to the disk drive loading of a naked disk can be done in much the same way as in the conventional tray-type loading method.

The present invention further provides a disk drive capable of having a disk loading adaptor detachably attached thereto, the loading adaptor including a tray member for removably holding an information recording disk, and a case member mounted on the tray member and movable relative to the tray member to open or close the loading adaptor, the disk being held on the tray member in a space formed between the tray and case members, the disk drive comprising a section for, in a condition where the loading adaptor is attached thereto, moving the loading adaptor between a first state to allow recording or reproduction onto or from the disk and a second state to allow the disk to be removed from the loading adaptor and changed for another disk. With this arrangement, the currently-loaded disk can be removed and changed for another disk without the need to detach the current loading adaptor itself from the disk drive, and it is possible to load both a disk previously set in a disk loading adaptor and a naked disk not previously set in a disk loading adaptor.

The disk drive may further comprise a section for allowing the disk loading adaptor to be attached to or detach from the disk drive by an entirety of the loading adaptor sliding relative to the disk drive, and a section for allowing the disk held on the tray member to be changed for another disk by, while the case member remains attached to the disk drive, causing the tray member to slide outwardly away from the case member in a direction substantially parallel to a sliding direction of the entirety of the loading adaptor so as to open the loading adaptor. Because the tray member is allowed to slide to open the loading adaptor while the case member remains attached to the disk drive, loading of a naked disk can be done in much the same way as in the conventional tray-type loading method.

The disk drive may further comprise a magnet section for, when the tray member slides relative to the case member, driving a clamping pulley that is vertically movably provided on the case member away from the tray member. This arrangement prevents the clamping pulley from colliding with the disk held on the tray member, when the tray member slides.

If the above-mentioned drive disk is designed to permit attachment thereto of a standardized disk cartridge other than the disk loading adaptor of the invention, it is possible to handle any disks set in the standardized disk cartridge and disk loading adaptor of the invention and a naked disk.

Now, the preferred embodiment of the present invention will be described in detail below with reference to the accompanying drawings.

DETAILED DESCRIPTION OF THE PREFERRED EMBODIMENTS

Figure 1A:
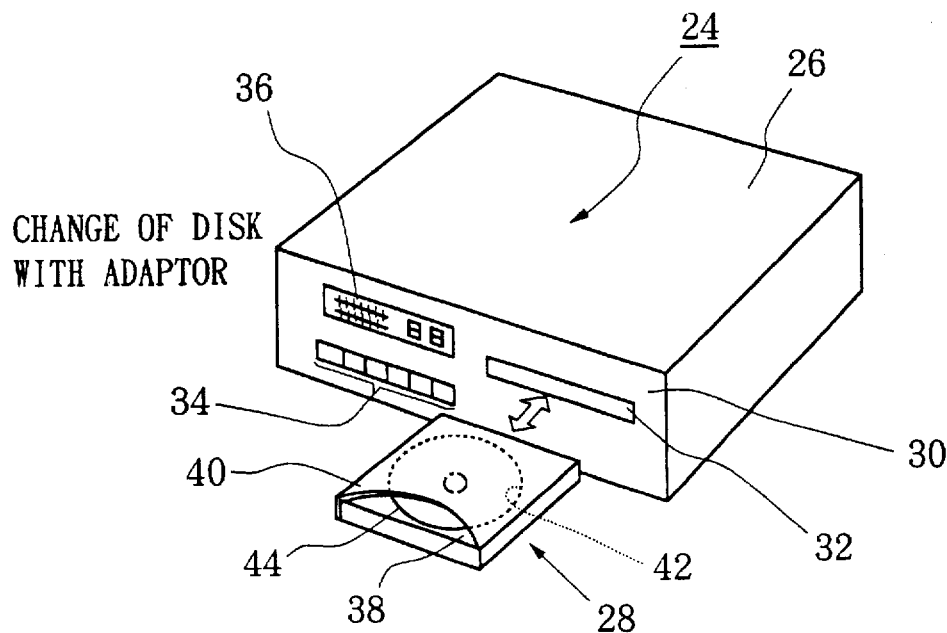
FIGS. 1A to 1C show in perspective view a disk loading system in accordance with an embodiment of the present invention.
Figure 1B:
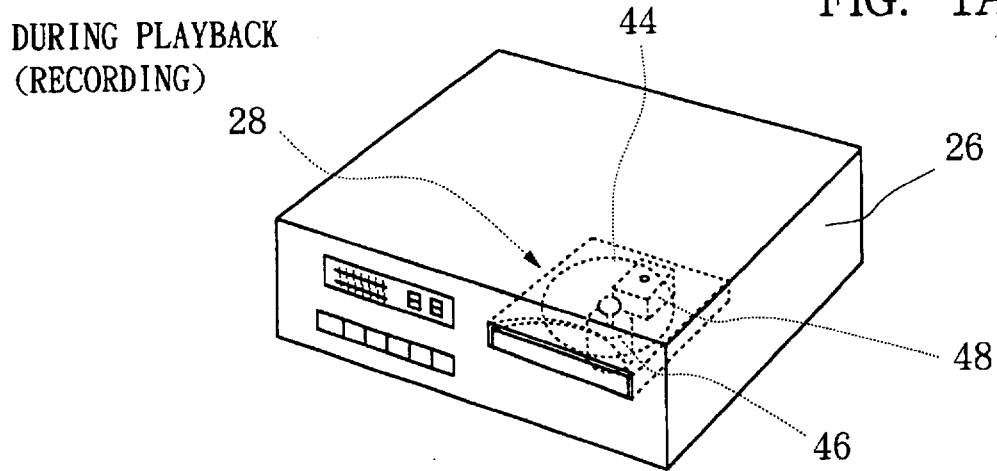
Figure 1C:
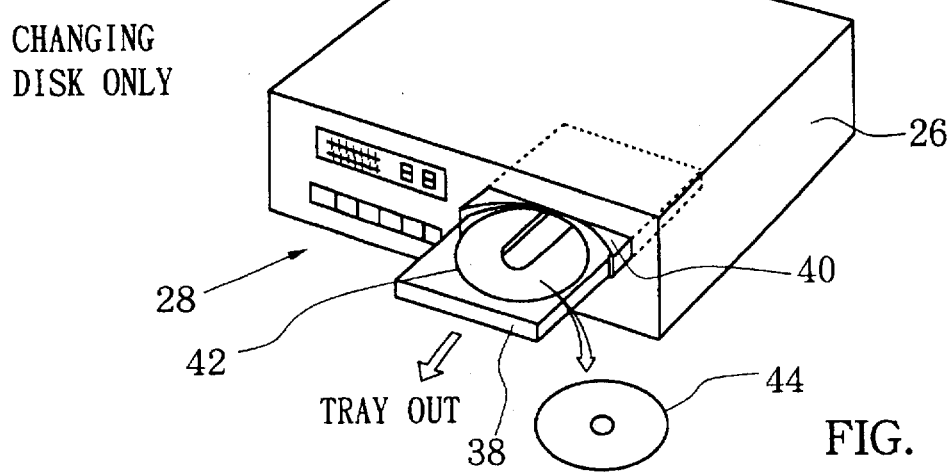
Figure 2:
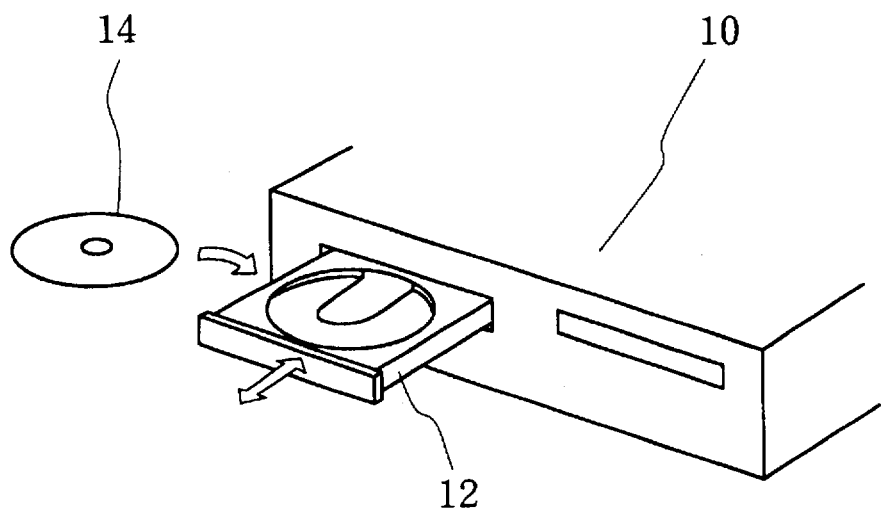
FIG. 2 is a perspective view showing a conventional tray type loading method.
Figure 3:
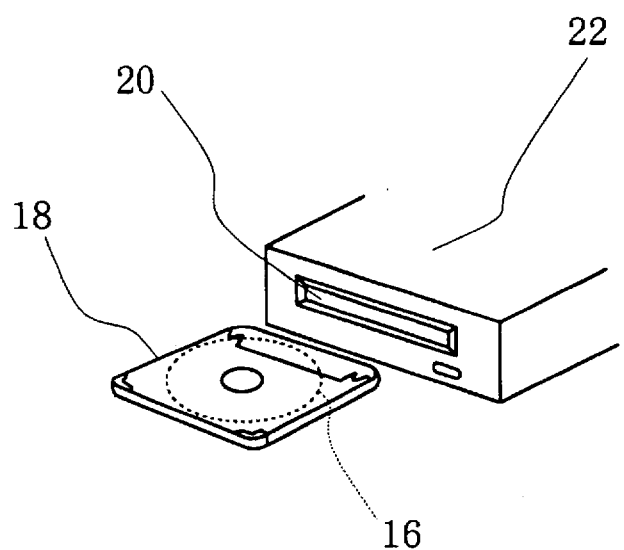
FIG. 3 is a perspective view showing a conventional slot-in type loading method.

FIGS. 1A to 1C show in perspective view a disk loading system 24 in accordance with an embodiment of the present invention, which generally comprises a disk drive 26 and a disk loading adaptor 28. The disk drive 26 is a disk recording, reproducing or recording/reproducing device which contains a loading mechanism, a spindle motor, a turntable, an optical head, etc. A front panel 30 of the disk drive 26 includes an adaptor insertion slot 32 for introducing therethrough the disk loading adaptor 28, various operating members 34, a display 36, etc.

The disk loading adaptor 28 is comprised of a tray member 38 and a case member 40 jointly forming an internal space for receiving or setting therein an information recording disk 44 (in this case, an optical disk including an optical magnetic disk). To expose the set disk 44 for access by the operator, the tray member 38 is pulled to slide relative to the case member 40 toward the operator (parallel to the direction where the loading adaptor 28 moves between the retracted and advanced positions) while the case member 40 remains held in the disk drive 26. The tray member 38 has an opening (denoted by 91 in FIG. 4) for receiving therein a turntable mounted on the upper end of the spindle motor as well as an optical pickup. The case member 40 is provided with a clamping pulley to allow the disk 44 to be driven while remaining set in the loading adaptor 28. If constructed to meet the requirements of standardized disk cartridge (e.g., CD-CADDY), any disk set in the standardized disk cartridge can be driven via the disk drive 26.

To drive (i.e., record or reproduce information onto or from) the disk 44 set in the loading adaptor 28, the adaptor 28 is inserted in the opening 32 as shown in FIG. 1A. FIG. 1B shows a condition where the insertion of the loading adaptor 28 has been completed, and the disk 44 is driven, in this condition, via the optical head 48 by clamping and then rotating the disk 44 by means of the spindle motor 46.

To change both of the currently-loaded disk 44 and loading adaptor 28 for another disk set in another loading adaptor, the current adaptor 28 containing the disk 44 is moved to the advanced position as shown in FIG. 1A. However, to change the current disk 44 for another disk not set in such an adaptor (naked disk), the tray member 38 is pulled to slide outwardly toward the operator, while the case member remains held in the disk drive 26, to make the internal space 42 accessible (FIG. 1C). Then, the current disk 44 is removed and changed for the other disk. Thus, the disk changing operation can be done in much the same way as in the conventional tray type loading method.

Figure 4:
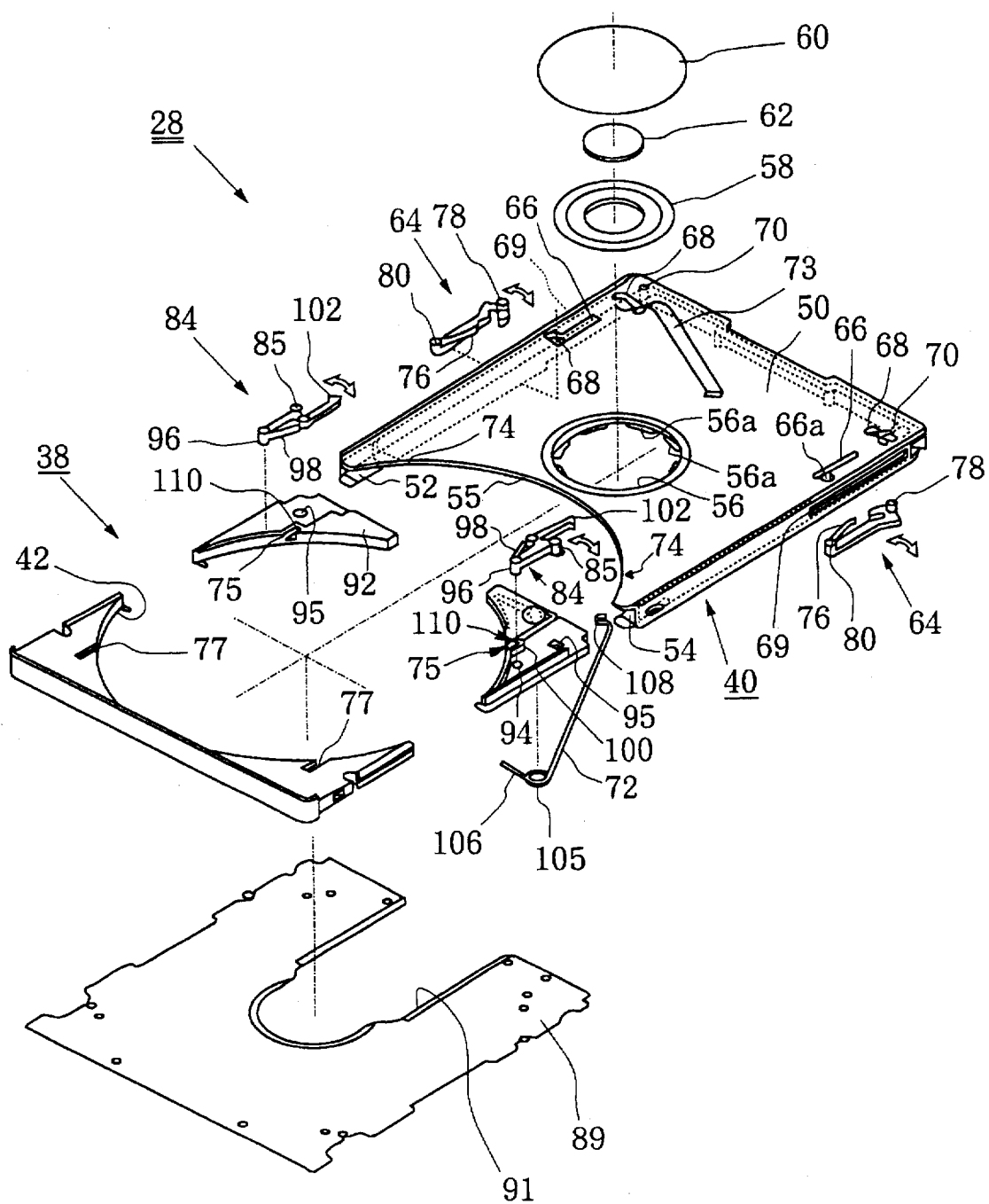
FIG. 4 is an exploded perspective view of a disk loading adaptor of FIG. 1.

In FIG. 4, there is shown a detailed structural example of the disk loading adaptor 28, which is designed in such a manner to meet the requirements of the standardized cartridge CD-CADDY.

The disk loading adaptor 28 is comprised of the case member 40 (case assembly) and the tray member 38 (tray assembly) as previously mentioned, and the case member 40 includes a case plate 50 formed of transparent plastics. In the left and right edge portion of the underside of the case plate 50 are formed rail channels 52, 54 for sliding movement therealong of the tray member 38. Further, one end of the case plate 50 closer to the operator is recessed inwardly in arc so as to provide such a recess 55 that acts to prevent the case plate 50 from interfering with the operation to attach/detach the disk to/from the tray member 38. The recess 55 may be of any shape as long as the case plate 50 does not interfere with the attachment/detachment of the disk while the case member 40 is being kept held in the disk drive 26.

A round hole 56 is formed in the center of the case plate 50. A clamping pulley 58 is received in the hole 56 (more specifically, the pulley 58 is placed on a plurality of inward projections 56a formed on the plate 50 around the lower end portion of the hole 56). The hole 56 is closed by an ornamental plate 60 which is secured, by an adhesive agent or the like, to the upper surface of the plate 50 around the hole 56. A chucking magnetic body 62 is pressed into the center of the clamping pulley 58 and mechanically secured thereto by an adhesive agent or the like. In this manner, the clamping pulley 58 holding the chucking magnetic body 62 is accommodated in the hole 56 between the projections 56a and the ornamental plate 60 in such a manner that it is vertically movable and rotatable therein.

In addition, the case plate 50 has slits 66 for holding opening levers 64 slide holes 68 for limiting the range of pivotal movement of the respective opening levers 64, guide slits 69 for receiving therein projections (to be described later) of the disk drive 26, locking claws 70 for locking the tray and case members 38 and 40 in the closed state, a locking slit 73 for slidably locking a torsion spring 72 that normally urges the tray and case members 38 and 40 in a direction to open the loading adaptor 28, stoppers 74 each in the form of a wedge-shaped protrusion for preventing the tray member 38 from being accidentally detached from the case member 40 when the tray member 38 is opened.

The opening levers 64 are provided for releasing the locked state of the tray member 38 by the locking claws 70. The opening levers 64 are attached to the case plate 50 by fitting spring portions 76 made of synthetic resin in the slits, inserting the projections 78 in the holes 68 for sliding movement therealong and lockingly engaging proximal portions 80 in end portions 66a of the slits 66. In the state where each of the opening levers 64 has been attached in this manner, the lever 64 is kept being pivoted about the proximal end portion 80, via the spring portion 76, outwardly in a parallel direction to the general surface of the case plate 50. The opening levers 64 are pressed by the corresponding projections of the disk drive 26 inserted through the guide slits 69, so as to be pivoted inwardly against the biasing force of the spring portions 76, thus releasing the locked state of the tray member 38 by the locking claws 70.

Figure 5:
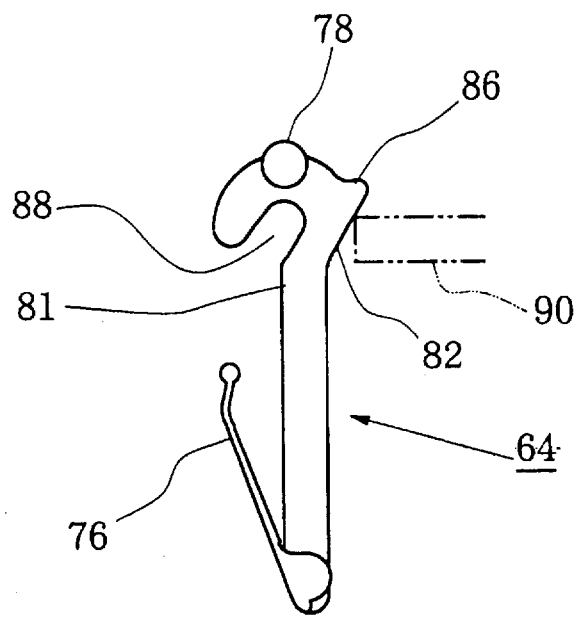
FIG. 5 is a plan view showing an opening lever of FIG. 4 in enlarged scale.

As shown in FIG. 5, each of the opening levers 64 has an inclined surface 82 that is pressed by the corresponding projection 90 of the disk drive 26 as the disk loading adaptor 38 is ejected from the disk drive 26. Further, in the opening lever 64, a pressing portion 81, in response to the pressing force applied from the the projection 90, presses a central projecting portion 85 of a corresponding closing lever 84 so as to release the locked state between a hook 102 of the closing lever 84 and the locking claw 70, to thereby permit the ejection of the tray member 38. A locking portion 86 is provided for locking the projection 90 of the disk drive 26, which has cl imbed over the inclined surface in response to ejection of the tray member 38, in cooperation with a predetermined portion of the case member 40, to thereby prevent siding movement of the case member 40. The opening lever 64 also has a concave portion 88 for receiving therein the central projecting portion 85 of the closing lever 84 as the tray member 38 is received in the case member 40 to thereby cause the opening lever 64 to pivot inwardly while preventing the central projecting portion 85 from being pressed by the pressing portion 81, so that the projection 90 moves past the locking portion 86 back onto the inclined surface 82.

Referring back to FIG. 4, the tray member 38 includes a tray base plate 89 made of a metal material or the like, in which an opening 91 is formed for insertion therein of the optical head and the turntable mounted on the upper end of the spindle motor of the disk drive. Disk guides 92 each made of a plastic material are fixedly mounted on the tray base plate 89 by means of screws or the like, and a circular space or pocket 42 is formed among the guides 92 to receive therein a disk. Each of the rear disk guides 92 has a stopper locking groove in which the corresponding stopper 74 is locked when the tray member 38 is opened to the maximum degree, and a slip-out prevention portion 110 formed at the dead end of the stopper groove 75. The fore disk guide 92 has a stopper receiving groove 77 to prevent the stopper 74 from colliding against the disk guide 92 as the tray member 38 is closed.

Figure 6:
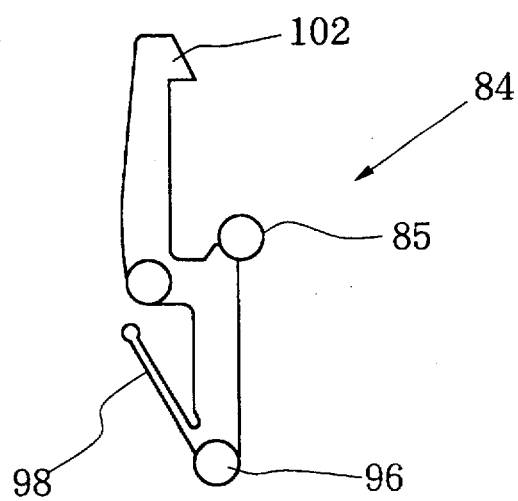
FIG. 6 is a plan view showing a closing lever of FIG. 4 in enlarged scale.

Each of the closing levers 84 is provided for locking the tray and case members 38 and 40 in the closed state by engaging the hook 102 formed at its tip with the corresponding claw 70. The closing lever 84 has a proximal end portion 96 rotatably fitted in a holding hole 94 of the corresponding rear disk guide 92, and the central projecting portion 85 fitted in a slide hole 95 for sliding movement over a predetermined range. Thus, the closing lever 82 is rotatable about the proximal end portion 96 within a predetermined angular range in a plane parallel to the general surface of the tray base plate 84. Further, the closing lever 84 has a spring portion 98 made of synthetic resin pressed against an abutment 100 of the corresponding rear disk guide 92 so that the lever 98 is normally urged in the outward direction. As seen from FIG. 6, the closing lever 84 is generally in the shape of a crank, and the abovementioned central projecting portion 85 is formed on its outer corner so as to be pressed by the pressing portion 81 (FIG. 5) of the opening lever 64.

The case and tray members 40 and 38 are connected with each other, by fitting and pressing the opposite side edges of the tray member 38 into the left and right rail channels 52 and 54 while a ring portion 105 of each torsion spring 72 is fitted around a boss (see FIG. 9(A)) formed on the underside of the disk guide 92, one end 106 of the spring 72 is engaged with a protrusion 107 (FIG. 9(A)) also formed on the underside of the spring 72 and the other end 108 is slidably engaged in the spring slit 73 formed obliquely in the case member 38. During this time, the stopper 74 climbs over the slip-out prevention portion 110 by virtue of resiliency of the entire case member 40. The stopper 74, after having climbed over the slip-out prevention portion 110, is prevented from slipping out when the tray member 38 is pulled out.

Figure 7:
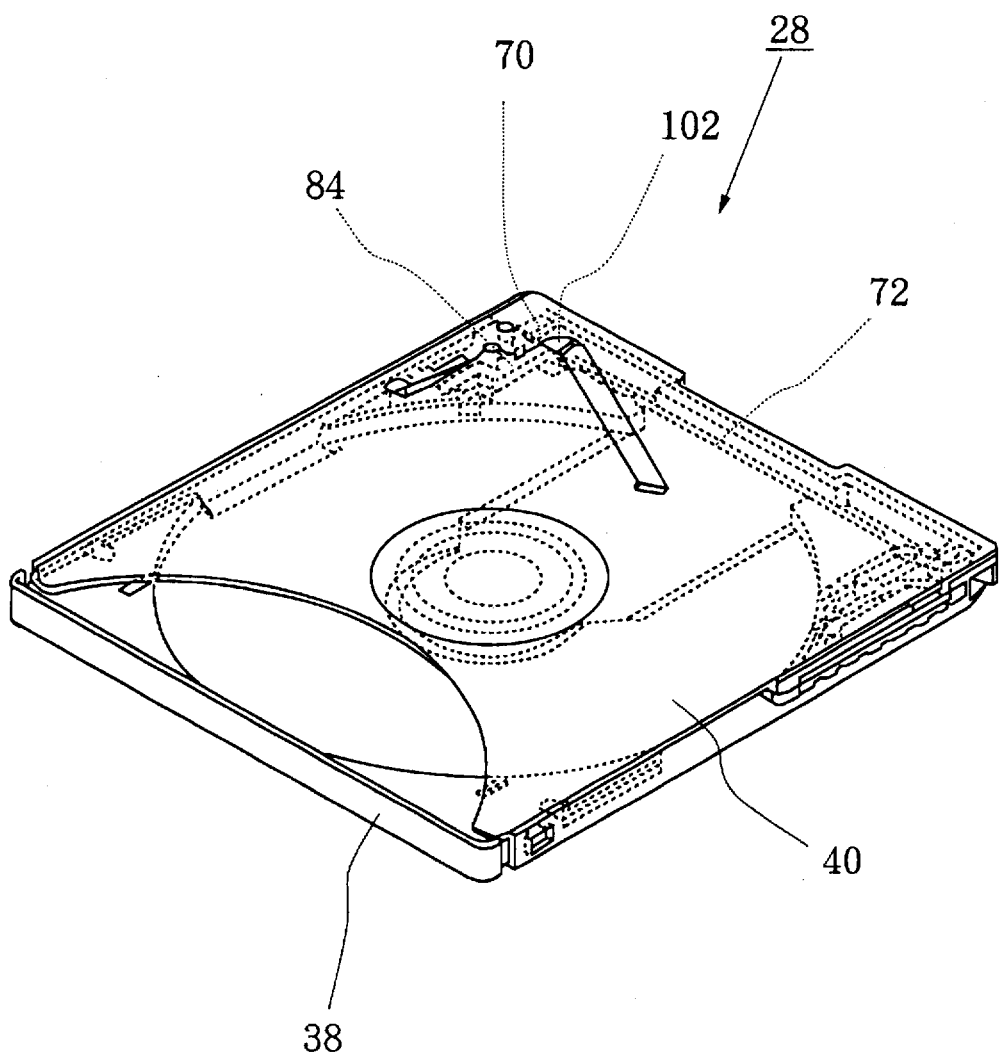
FIG. 7 is a perspective view showing the disk loading adaptor of FIG. 4 in the closed state.

FIG. 7 shows the disk loading adaptor 28 of the abovementioned structure in a condition where the tray member 38 is closed. When the tray member 38 is closed, the hook 102 at the tip of each closing lever 84 is engaged with the corresponding locking claw 70 formed on the rear end portion of the case member 40. Once the hook 102 of each closing lever 84 is disengaged from the locking claw 70, the tray member 38 slides to open by virtue of the biasing force of the torsion spring 72, as shown in FIG. 8.

Figure 8:
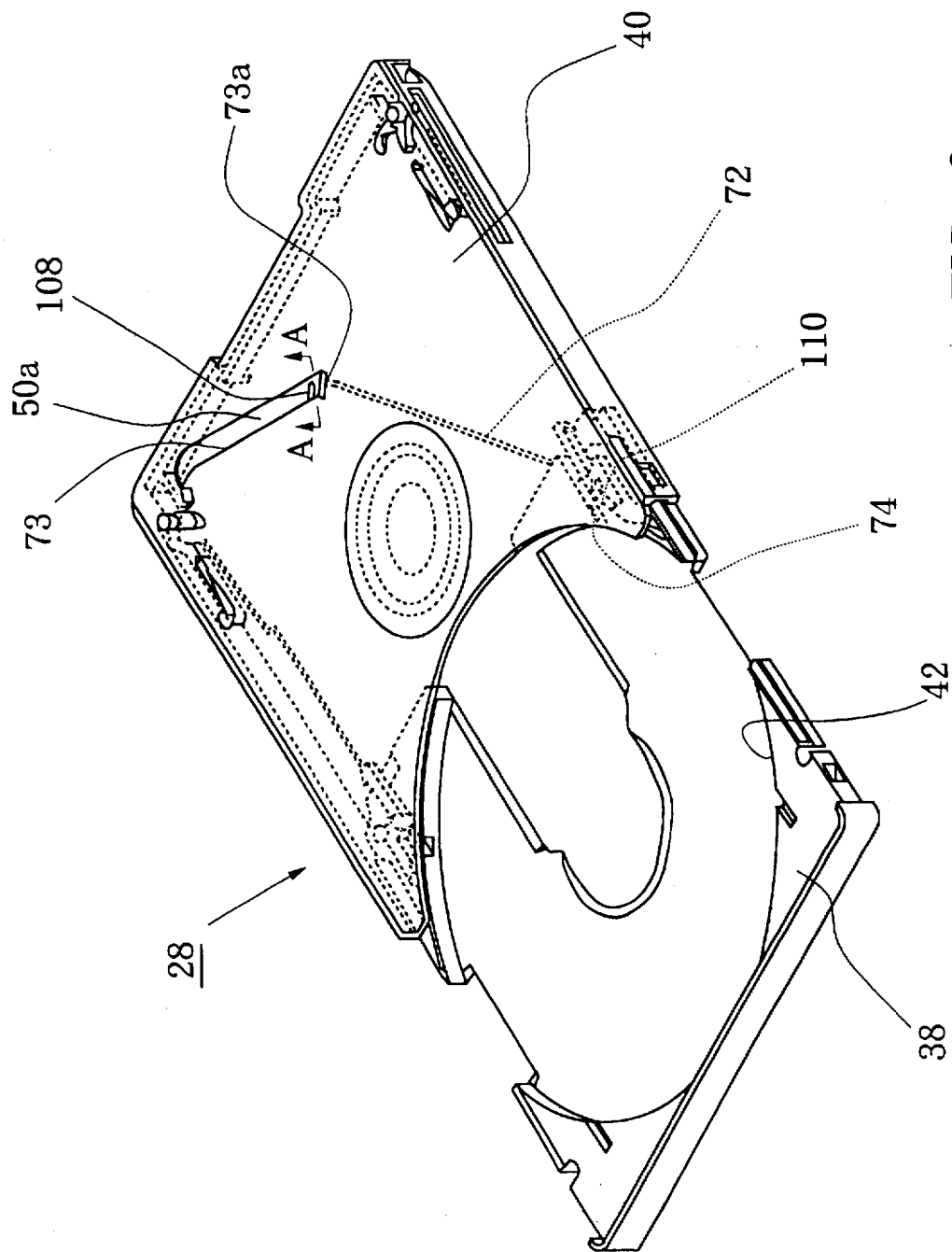
FIG. 8 is a perspective view showing the disk loading adaptor of FIG. 4 in the open state.
Figure 14:
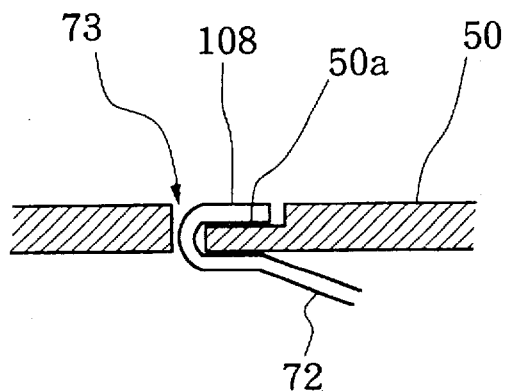
FIG. 14 is a sectional view taken along line A—A of FIG. 8.

The spring slit 73 in which the end 108 of the torsion spring 72 is slidably engaged is formed in a dented portion provided in the upper side of the case plate 50 (see FIG. 14 which is a sectional view taken along line A—A of FIG. 8). At one end of the dented portion is formed a hole 73a in communication with the spring slit 73 for receiving therein the end 108 of the torsion spring 72 during assembly. The dented portion 50a is provided to prevent the end 108 of the torsion spring 72 from accidentally coming off the upper surface of the case plate 50.

Figure 9:
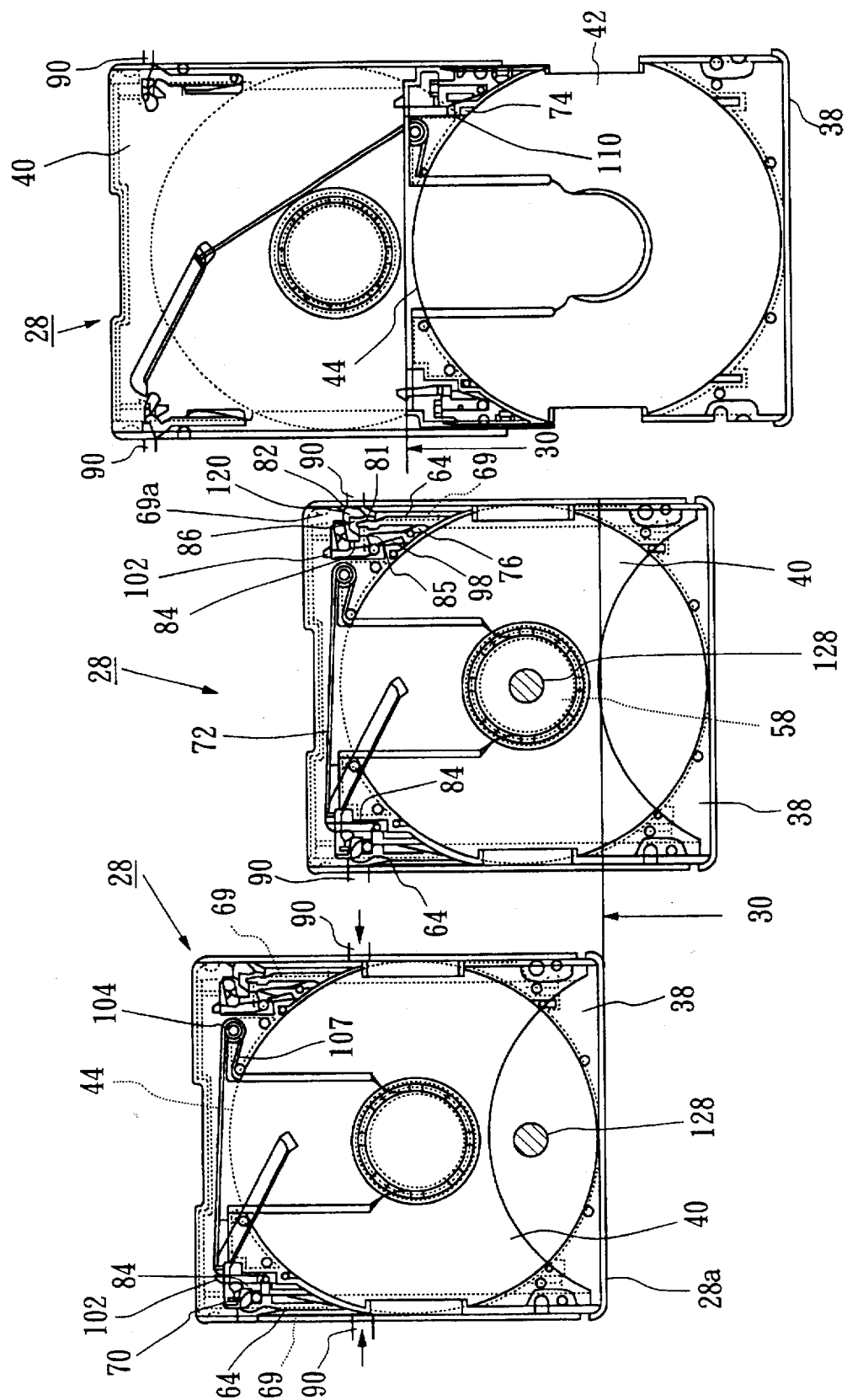
FIGS. 9(A) to 9(C) show in plan view a manner in which the disk loading adaptor of FIG. 4 is unloaded from a disk drive.
Figure 10:
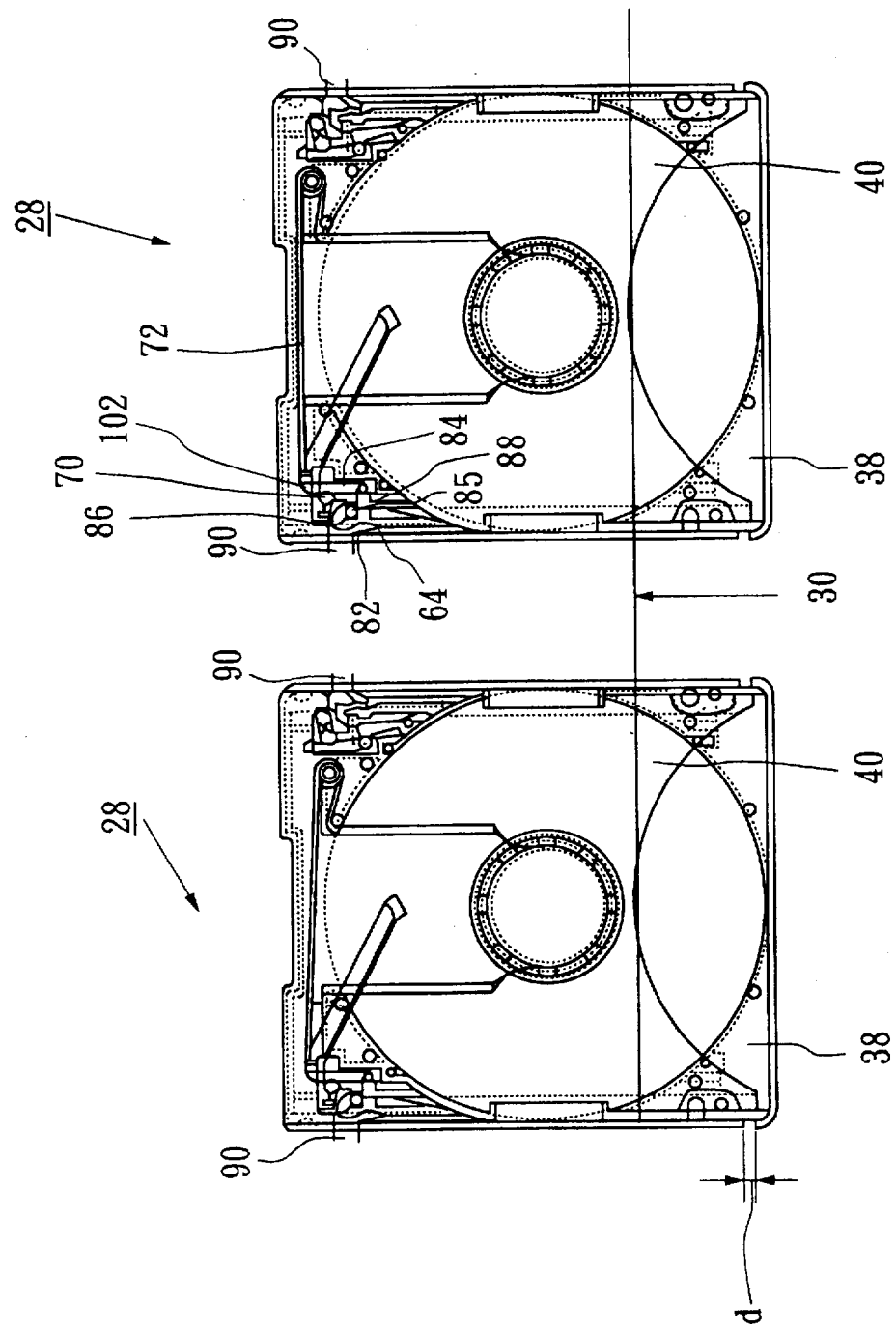
FIGS. 10(A)–10(B) show in plan view a manner in which the disk loading adaptor is loaded into the disk drive.

With reference to FIGS. 9 and 10, a description will be made as to how the above-described disk loading adaptor 28 is attached to and detached from the disk drive 26 and how the tray member 38 is pulled out to change the disk while the loading adaptor 28 is kept being attached to the disk drive 26. As the disk loading adaptor 28 is pushed into the disk drive 26 by hand, a loading start switch provided within the disk drive 26 is turned on by the adaptor 28, upon which a loading drive is activated so that the disk loading adaptor 28 is automatically (electrically) drawn until it comes to a predetermined loaded position within the disk drive as shown in FIG. 9(A). Namely, the disk loading adaptor 28 stops being drawn when the fore end surface 28a thereof has come to a substantially same plane as the front panel 30 (more specifically, the loading drive is deactivated once a limit switch provided within the drive 26 or the like detects that the adaptor 28 has come to the predetermined loaded position. In this condition, the hook 102 formed at the tip of each closing lever 84 is in engagement with the corresponding locking claw 70 so that the tray member 38 is held in the locked condition within the case member 40.

After the loading adaptor 28 has been loaded in the disk drive 26, when a projection setting operation is executed by actuating a predetermined operating member in the form of a lever, knob or the like (this projection setting operation is not necessarily essential where both the disk 44 and loading adaptor 28 receiving the disk 44 are changed), the projections 90 of the disk drive 26, which are provided for movement in the axial direction thereof toward, and away from the left and right sides of the disk loading adaptor 28, are driven manually or electrically to move toward the loading adaptor 28 and inserted into the guide slits 69 formed in the opposite sides of the adaptor 28. Then, each of the projections 90 is held in such a position where it lightly abuts against or floats slightly above the bottom surface of the corresponding guide slit 69. In this way, the projections 90 are set in place, and the disk drive 26 is now ready for recording or reproducing information onto or from the disk 44 contained in the loading adaptor 28.

When an eject operation is executed after completion of the recording or reproduction, the loading adaptor 28 is forced out of the disk drive 26 via the loading drive. Once the projections 90 abut against the inclined surfaces 82 of the corresponding opening levers 64 while the loading adaptor 28 is forced out of the disk drive 26, the opening levers 64 are pressed inwardly by the projections 90 against the biasing force of the spring portions 76, as shown in FIG. 9(B). As the opening levers 64 are pressed inwardly, the pressing portion 81 of each opening lever 64 pushes the projecting portion 85 of the corresponding closing lever 84, so that the closing lever 84 is pressed inwardly against the biasing force of the spring portion 98. This releases the engagement between the hooks 102 of the closing levers 84 and the locking claws 70 of the case plate 50.

After the engagement between the hooks 102 and the locking claws 70 is released, as the disk loading adaptor 28 is further forced out, each of the projections 90 climbs over the inclined surface 82 of the opening lever 64 and stops moving at a position where it abuts against the rear end 69a of the corresponding guide slit 69 (i.e., the loading drive is deactivated when a limit switch provided within the disk drive 26 or the like detects the arrival at the position of the projection 90). In this condition, the case member 40 is no longer slidable with each projection 90 locked in a space formed between the rear end 69a of the guide slit 69 and the locking portion 86.

On the other hand, the tray member 38, after the engagement between the hooks 102 and the locking claws 70 is released, is pulled via the biasing force of the torsion spring 72 toward the operator to slide out of the case member 40. As shown in FIG. 9(C), the sliding movement of the tray member 38 is stopped at a position where the stoppers 74 engage the slip-out prevention portions 110 (i.e., where the disk receiving pocket 42 is fully opened). Thus, in this condition, it is possible to take out the disk 44 and change it for another naked disk. By manually pushing the tray member 38 after the disk changing operation, the tray member 38 with the new disk set thereon can be forced into the case member 40.

As the tray member 38 is forced into the case member 40, each of the closing levers 64 comes into biting engagement with the corresponding locking claw 70, so that the tray member 38 is locked by the case member 40. By further pushing the tray member 38 in this condition (the tray member 38 can be further forced in by an additional distance denoted by "d" in FIG. 10(A)), the central projecting portion 85 of each closing lever 84 is trapped in the concave portion 88 of the corresponding opening lever 64, which in turn is drawn to move inwardly (each closing lever 84 can not move outwardly since the hook 102 abuts against the locking claw 70).

The inward movement of the opening levers 64 releases the engagement between the locking portions of the opening levers 84 and the projections 90, to place the case member 40 in a slidable condition. Consequently, by further pushing the tray member 38, the case member 40 is forced into the disk drive 26 along with the tray member 38. As the disk loading adaptor 28 is thus forced into the disk drive 26, the loading start switch provided within the disk drive 26 is turned on by the loading adaptor 28. This triggers the loading drive to cause the loading adaptor 28 to be released from the operator's hand and then electrically introduced into the disk drive 26. Once the disk loading adaptor 28 is released from the operator's hand, the tray member 38 is pushed toward the operator, via the resilient force of the torsion spring 72, by the distance d, to assume a predetermined normal positional relation to the case member 40 where the tray member 38 is separate from the case member 40 by the distance d.

Then, the loading operation is completed in such a condition where the fore end surface 28a of the disk loading adaptor 28 is substantially flush with the front panel 30. With the above-mentioned arrangement, loading of a naked disk can be done in much the same way as the conventional tray type loading method. To set a disk in an empty disk loading adaptor 28 as well, the naked disk is placed in the empty loading adaptor 28 by opening the tray member 38 while the adaptor 28 is kept being attached to the disk drive 26.

On the other hand, the disk loading adaptor 28 can be ejected in its entirety as with the standard cartridge (CD-CADDY), by performing a normal ejecting operation after the above-mentioned lever or knob on the front panel 30 is operated in such a direction as to retract the projections 90 in the condition shown in FIG. 9(A) (the electric or automatic ejection of the loading adaptor 28 is terminated in or around the condition shown in FIG. 9(B), and thereafter the adaptor 28 is pulled off by hand). Alternatively, the loading adaptor 28 may be ejected in its entirety by first operating the lever or knob on the front panel 30 in such a direction as to retract the projections in the condition shown in FIG. 9(C) and then pulling out the case member 40 toward the operator.

If, the pressing force of the torsion spring 72 against the case portion 40 is excessive when the projections 90 of the disk drive 26 are climbing over the locking portions 86 and inclined surfaces 82 in and after the operation shown in FIG. 10(C), the case member 40 is urged to move back by the distance d and the opening levers 64 press the respective closing levers 84, thus causing the possibility that the locking engagement between the hooks 102 and claws 70 will be released accidentally. To prevent this inconvenience, the resilient biasing force of the torsion spring 72 may be selected to establish the following relationship while the projections 90 climb over the locking portions 86:

(pressing force of the torsion spring 72 against the case member 40)<(counteractive force of the disk drive 26 against the ejection)

Figure 11:
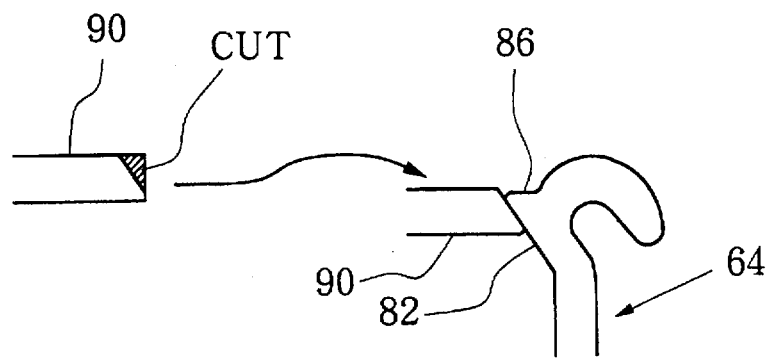
FIG. 11 is a plan view showing a modified example of a projection provided within the disk drive.

Alternatively, the distal end of each projection 90 may be cut off obliquely as shown in FIG. 11: in this case, the opening levers 64 immediately return to a neutral position even if the case member 40 is urged to move back by the distance d while the projections 90 climb over the locking projections 86 and inclined surfaces 82, so that the closing levers 84 are not pressed inwardly strongly. This prevents the locking engagement between the hooks 102 and claws 70 from being accidentally released.

Figure 12A:
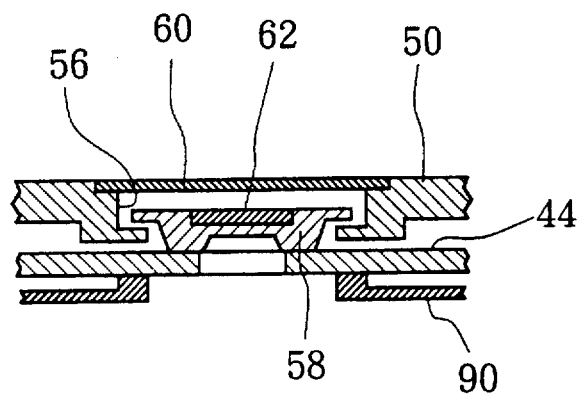
FIGS. 12A to 12C are side views in cross section explanatory of the operation of a clamping pulley.
Figure 12B:
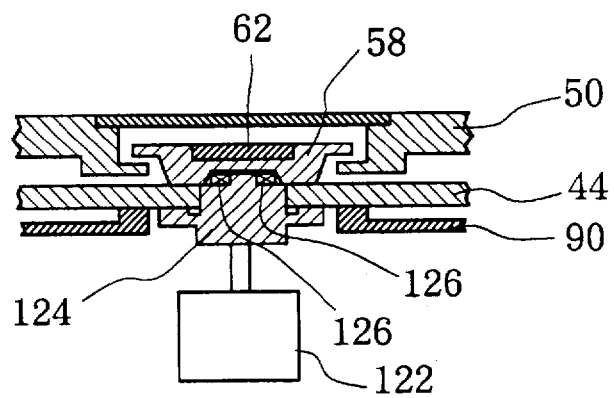
Figure 12C:
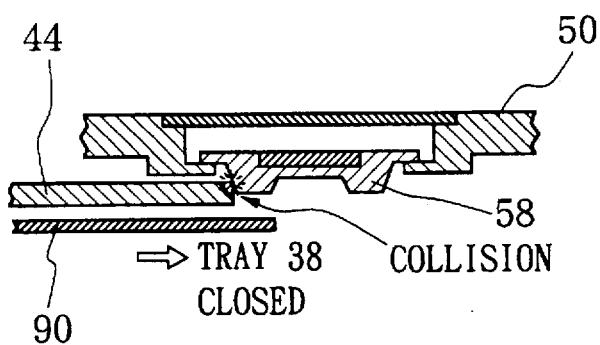
Figure 12D:
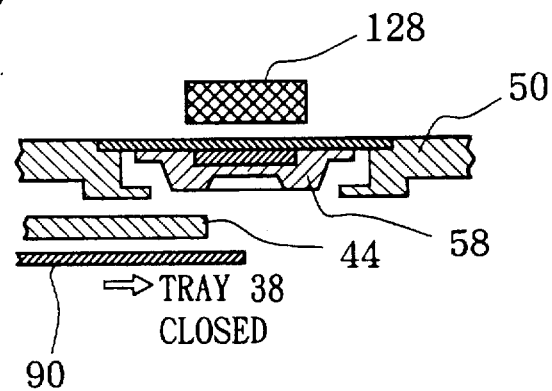
FIGS. 12D is a side view in cross section explanatory of the operation of an evacuating magnet.

To describe the clamping pulley 58 attached to the case member 40, this pulley 58 in the non-chucking position as shown in FIG. 12A is lowered to abut against the disk 44, but in the chucking state as shown in FIG. 12B, the pulley 58 is raised via the disk 44 chucked by an attracting force created between a chucking magnet 126 incorporated in the turntable 124 on the upper end of the spindle motor 122 and the chucking magnetic body 62. Thus, in opening or closing the tray member 38 in the non-chucking position, the disk 44 is very likely to be damaged by colliding with the clamping pulley 58 as shown in FIG. 12C.

To avoid such collision, the present embodiment employs an evacuating magnet (permanent magnet or electromagnet) 128 fixedly provided at a predetermined position within the disk drive 26 immediately above the clamping pulley 58 when the tray member 38 is about to start sliding relative to the case member 40 as shown in FIG. 9(B). This evacuating magnet 128 acts to evacuate the clamping pulley 58 to a predetermined upper limit position so as to prevent the disk 44 from colliding with the clamping pulley 58. The evacuating magnet 128 will impart no adverse magnetic influence since it is spaced from the spindle motor 122 and optical head by sufficient distances.

Figure 13:
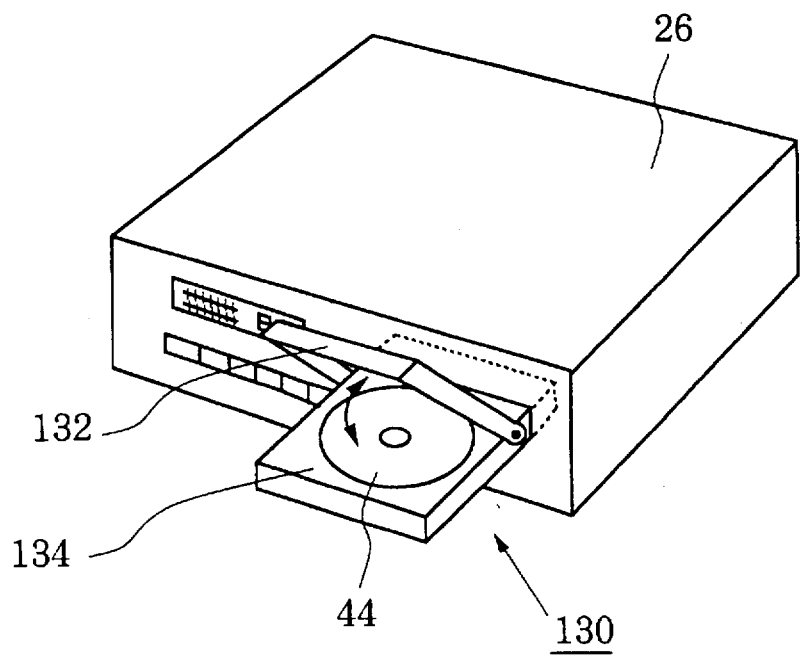
FIG. 13 is a perspective view showing a tray type disk loading system in accordance with another embodiment of the present invention.

Although in the above-described embodiment, the tray member 38 is slided to open or close the loading adaptor 28, a modified disk loading adaptor 130 shown in FIG. 13 comprises a pivotable case member 132, as with the conventional CD case, which is pivotable between the opened and closed positions by spring or by hand. In this case, the loading adaptor 130 is arranged in such manner that the case member 132 can be opened or closed with a tray member 134 remaining attached to the disk drive 26.

Further, although in the above-described embodiment, the tray member 38 is moved to the opening position by the resilient force of the torsion spring 72, it may be pulled out by hand from the position shown in FIG. 9(B). Furthermore, although the embodiment has been described in connection with the standardized disk cartridge CD-CADDY, the present invention may be constructed to meet any other standardized requirements.

Moreover, instead of setting a sheer naked disk (e.g., 12 cm CD) in the disk loading adaptor as in the above-described embodiment, a disk previously contained in any other type adaptor (having a 12 cm diameter) such as an adaptor for an 8 cm CD may be put in the disk loading adaptor of the invention.

Furthermore, although the embodiment has been described above as applied to an optical disk loading technique, the present invention is also applicable to loading of any other disks such as a magnetic disk.

The arrangement as has been described so far permits loading of both a disk previously set in a disk loading adaptor and a naked disk not previously set in a disk loading adaptor, to thereby greatly simplify the disk handling operation.

What is claimed is:

1. A disk loading system comprising:

a disk loading adaptor for removably setting therein an information recording disk, said disk loading adaptor having a case member and a tray member;

a disk drive for having said disk loading adaptor detachably attached thereto; and engagement means in said disk drive for engaging with said disk loading adaptor, wherein said disk drive is capable of moving said disk loading adaptor between a first state to allow recording or reproduction onto or from the disk, a second state to allow the disk to be removed from said disk loading adaptor and changed for another disk, and a third state to allow said disk loading adaptor to be completely removed from said disk drive, in said second state, said engagement means is engaged with said disk loading adaptor to allow said disk loading adaptor to move but prohibit removal of said disk loading adaptor from said disk drive, so that said disk loading adaptor is attached to said disk drive while the disk is being changed, and in said third state, said engagement means releases from said disk loading adaptor to allow said disk loading adaptor to be completely removed from said disk drive; and magnet means in said disk drive for evacuating a clamping pulley, which is vertically movably provided on the case member, to a predetermined position away from the disk when the tray member holding the disk slides relative to the case member during said second state so that the disk does not collide with the clamping pulley.

2. A disk loading adaptor for attachment to a disk drive, said disk loading adaptor comprising:

a tray member for removably holding an information recording disk;

a case member mounted on said tray member and movable relative to said tray member to open or close said disk loading adaptor, the disk being held on said tray member in a space formed between said tray and case members; and a clamping pulley which is vertically movably provided on the case member, wherein the disk held on said tray member can be changed for another disk by moving at least one of said tray and case members outwardly away from the other of said tray and case members to open said disk loading adaptor while the other remains fixedly attached to said disk drive by engagement with an engagement means, which is in said disk drive and engages with said disk loading adaptor to allow said disk loading adaptor to be opened but prohibit removal of said disk loading adaptor from said disk drive, the clamping pulley is evacuated by magnet means to a predetermined position away from the disk when the tray member holding the disk slides relative to the case member so that the disk does not collide with the clamping pulley, and said engagement means is releasable to allow said disk loading adaptor to be completely removed from said disk drive.

3. The disk loading adaptor as defined in claim 2, further comprising:

resilient means for normally urging said tray and case members in a direction to open said disk loading adaptor; and locking means for locking said tray and case members in a condition to close said disk loading adaptor against a biasing force of said resilient means.

4. The disk loading adaptor as defined in claim 2, wherein said disk loading adaptor is attached to or detached from said disk drive by an entirety of said disk loading adaptor sliding relative to said disk drive, and the disk held on said tray member can be changed for said another disk while said case member remains fixedly attached to said disk drive, by allowing said tray member to slide outwardly away from said case member in a direction substantially parallel to a sliding direction of the entirety of said disk loading adaptor.

5. A disk drive capable of having a disk loading adaptor detachably attached thereto, said disk loading adaptor including a tray member for removably holding an information recording disk, and a case member mounted on the tray member and movable relative to the tray member to open or close said disk loading adaptor, the disk being held on the tray member in a space formed between the tray and case members, said disk drive comprising:

means for moving said disk loading adaptor between a first state to allow recording or reproduction onto or from the disk, and a second state to allow the disk to be removed from said disk loading adaptor and changed for another disk while the disk loading adaptor is fixedly attached to said disk drive;

means for moving said disk loading adaptor to a third state to allow said disk loading adaptor to be completely removed from said disk drive, the disk loading adaptor being unattached to said disk drive in said third state; and magnet means for evacuating a clamping pulley, which is vertically movably provided on the case member, to a predetermined position away from the disk when the tray member holding the disk slides relative to the case member during the second state so that the disk does not collide with the clamping pulley.

6. The disk drive as defined in claim 5, further comprising:

means for allowing said disk loading adaptor to be attached to or detached tom said disk drive by an entirety of the disk loading adaptor sliding relative to said disk drive; and means for allowing the disk held on the tray member to be changed for said another disk while the case member remains fixedly attached to said disk drive, by causing the tray member to slide outwardly away from the case member in a direction substantially parallel to a sliding direction of the entirety of the disk loading adaptor so as to open said disk loading adaptor.

7. The disk drive as defined in claim 5, further comprising:

engagement means for engaging with said disk loading adaptor when it is in said second state, said engagement means allowing at least one of said tray and case members of said disk loading adaptor to move but prohibiting removal of said disk loading adaptor from said disk drive; and disengagement means for releasing said engagement means from said disk loading adaptor when it is in said third state so that said disk loading adaptor can be completely removed from said disk drive.

8. A disk drive capable of having a disk loading adaptor detachably attached thereto, said disk loading adaptor including a tray member for removably holding an information recording disk, and a case member mounted on the tray member and movable relative to the tray member to open or close said disk loading adaptor, the disk being held on the tray member in a space formed between the tray and case members, said disk drive comprising:

means for, in a condition where the disk loading adaptor is attached thereto, moving said disk loading adaptor between a first state to allow recording or reproduction onto or from the disk and a second state to allow the disk to be removed from said disk loading adaptor and changed for another disk;

means for allowing said disk loading adaptor to be attached to or detached from said disk drive by an entirety of the disk loading adaptor sliding relative to said disk drive;

means for allowing the disk held on the tray member to be changed for said another disk while the case member remains attached to said disk drive, by causing the tray member to slide outwardly away from the case member in a direction substantially parallel to a sliding direction of the entirety of the disk loading adaptor so as to open said disk loading adaptor; and magnet means for, when the tray member holding the disk slides relative to the case member, evacuating a clamping pulley that is vertically movably provided on the case member away from the disk during the second state so that the disk does not collide with the clamping pulley.

9. A disk drive capable of having a disk loading adaptor detachably attached thereto, said disk loading adaptor including a tray member for removably holding an information recording disk, and a case member mounted on the tray member and movable relative to the tray member to open or close said disk loading adaptor, the disk being held on the tray member in a space formed between the tray and case members, said disk drive comprising:

means for moving said disk loading adaptor between a first state to allow recording or reproduction onto or from the disk and a second state to allow the disk to be removed from said disk loading adaptor and changed for another disk;

means for allowing said disk loading adaptor to be attached to or detached from said disk drive by an entirety of the disk loading adaptor sliding relative to said disk drive;

means for allowing the disk held on the tray member to be changed for said another disk by causing the tray member to slide outwardly away from the case member in a direction substantially parallel to a sliding direction of the entirety of the disk loading adaptor so as to open said disk loading adaptor; and magnet means for evacuating a clamping pulley, which is vertically movably provided on the case member, away from the disk when the tray member holding the disk slides relative to the case member during the second state so that the disk does not collide with the clamping pulley.

* * * * *